US008153234B2

(12) United States Patent
Nollet et al.

(10) Patent No.: US 8,153,234 B2
(45) Date of Patent: Apr. 10, 2012

(54) FLOOR PANEL AND METHOD FOR MANUFACTURING A FLOOR PANEL

(75) Inventors: Oke Nollet, Aalter (BE); Christophe Naeyaert, Jabbeke (BE)

(73) Assignee: Flooring Industries Limited, SARL Bertrange (LU)

( * ) Notice: Subject to any disclaimer, the term of this patent is extended or adjusted under 35 U.S.C. 154(b) by 1420 days.

(21) Appl. No.: 11/304,761

(22) Filed: Dec. 16, 2005

(65) Prior Publication Data

US 2006/0130421 A1 Jun. 22, 2006

Related U.S. Application Data

(60) Provisional application No. 60/672,868, filed on Apr. 20, 2005.

(30) Foreign Application Priority Data

Dec. 16, 2004 (BE) .................................. 2004/0618

(51) Int. Cl.
*D06N 3/00* (2006.01)
*E04C 2/20* (2006.01)
*B32B 3/26* (2006.01)

(52) U.S. Cl. .............. 428/151; 428/57; 428/58; 428/45; 428/141; 428/156; 428/195.1; 52/578

(58) Field of Classification Search .................. 428/151, 428/57, 58, 45, 141, 156, 195.1; 52/578
See application file for complete search history.

(56) References Cited

U.S. PATENT DOCUMENTS

| | | | | |
|---|---|---|---|---|
| 5,662,977 | A | 9/1997 | Spain et al. | |
| 6,013,350 | A | 1/2000 | Mizuno | |
| 2004/0023006 | A1 | 2/2004 | Mead | |
| 2004/0028830 | A1 | 2/2004 | Bauer | |
| 2004/0086678 | A1* | 5/2004 | Chen et al. | 428/44 |
| 2004/0241416 | A1* | 12/2004 | Tian et al. | 428/304.4 |
| 2004/0255541 | A1 | 12/2004 | Thiers et al. | |
| 2005/0076598 | A1 | 4/2005 | Lewark | |

FOREIGN PATENT DOCUMENTS

| | | |
|---|---|---|
| DE | 28 33 066 | 2/1979 |
| DE | 30 24 919 | 1/1981 |
| DE | 3120351 | 12/1982 |
| DE | 3802396 | 8/1989 |
| DE | 10217919 | 11/2003 |
| DE | 203 17 527 | 2/2004 |
| EP | 1 052 116 | 11/2000 |
| EP | 1 482 085 | 12/2004 |
| GB | 2 002 260 | 2/1979 |
| GB | 2 054 458 | 2/1981 |
| JP | 08072140 | 3/1996 |
| JP | 08072141 | 3/1996 |
| JP | 10-202818 | 4/1998 |

(Continued)

*Primary Examiner* — William P Watkins, III
(74) *Attorney, Agent, or Firm* — Bacon & Thomas, PLLC

(57) ABSTRACT

Floor panel, whereby this floor panel (1) includes a decor (8), as well as a top layer or laminate layer (9) on the basis of synthetic material (10), and whereby the decorative side (16) of the floor panel (1) imitates a wood pattern, wherein the floor panel (1), at its upper surface, has zones (22-23) of different gloss degrees, which extend over the upper surface as a function of the imitated global wood pattern.

41 Claims, 6 Drawing Sheets

FOREIGN PATENT DOCUMENTS

| | | |
|---|---|---|
| JP | 10-2028118 | 4/1998 |
| WO | WO 97/47834 | 12/1997 |
| WO | WO 01/96688 | 12/2001 |
| WO | WO 02/00449 | 1/2002 |
| WO | WO 02/058924 | 8/2002 |
| WO | WO 2005/046987 | 5/2005 |

* cited by examiner

FLOOR PANEL AND METHOD FOR MANUFACTURING A FLOOR PANEL

CROSS-REFERENCE TO RELATED APPLICATION

This application claims the benefit under 35 U.S.C. 119(e) of Provisional Application No. 60/672,868 filed Apr. 20, 2005, the entirety of which is incorporated by reference in this application.

BACKGROUND OF THE INVENTION

A. Field

This invention relates to a floor panel, more particularly a laminate floor panel, as well as a method for manufacturing a floor panel.

B. Related Art

In particular, it relates to a floor panel of the type intended for forming a floating floor covering, whereby this floor panel comprises a decor, preferably a printed decor, as well as a top layer based on synthetic material, and whereby the decorative side of the floor panel imitates a wood pattern.

It is known that with laminate floor panels, often wooden floor parts or parquetry are imitated. It is known that the imitation mostly is performed by providing the floor panel with a printed decor representing a photographic image of wood.

When imitating certain kinds of wood, in first instance dark and/or exotic kinds of wood, such as Wenge, the usual techniques are leading to less satisfying results.

SUMMARY OF THE INVENTION

The present invention generally aims at a novel floor panel whereby new possibilities are offered in order to perform an imitation. More specifically, it offers a solution in order to be able to realize good imitations of dark and/or exotic kinds of wood.

To this aim, the invention, according to its first aspect, relates to a floor panel, more particularly of the type intended for forming a floating floor covering, whereby this floor panel comprises a decor, as well as a top layer on the basis of synthetic material, and whereby the decorative side of the floor panel imitates a wood pattern, with the characteristic that the floor panel, at its upper surface, has zones of different gloss degrees, which extend over the upper surface in function of the imitated global wood pattern.

By the global wood pattern, at least large zones of the wood pattern are meant, and, thus, not only local phenomena, such as wood pores, wood calluses, or local deeper portions between wood nerves.

By working with wood patterns that, in their totality, are formed by zones of different gloss degrees, an additional dimension is added to the floor panel, whereby new application possibilities are created, which also has as a consequence that difficult to imitate kinds of wood now can be represented in a better manner.

Preferably, for the aforementioned zones, at least two respective gloss degrees are applied, which can clearly be distinguished by the user, i.e. are visible to the naked eye.

More particularly, it is preferred that, for the aforementioned zones, respectively at least two gloss degrees are applied, which are chosen such that certain zones clearly manifest themselves as matte zones, whereas other zones manifest themselves as non-matte or glossy zones.

The most matte zones on the floor panel preferably have a gloss degree of 10 or even better less than 10, whereas the less matte or glossy zones have a gloss degree of more than 10, and even better more than 20, all as measured according to DIN 67530.

Irrespective of the applied absolute gloss degrees, the difference in gloss degree between the matte and glossy zones of the floor panel preferably is at least 10.

When the laminate is manufactured by means of a press process and the zones of different gloss degree are realized by making use of a press plate having zones of different gloss degree, then the gloss degrees, measured on the press plate, preferably are less than 40 in the matte zones and more than 40, and even better more than 100, in the glossy zones.

In the most preferred form of embodiment, the upper side, at the location of the wood structure, substantially has only two gloss degrees, with which it is meant that, by the naked eye, from a normal eye height above installed floor panels and at a suitable angle, only two clearly different gloss degrees can be distinguished. Hereby, a clear contrast among adjacent zones can be created. Thus, then there will be no zones of an intermediate gloss degree.

In a particular form of embodiment, the decor is made in one colour or substantially in one colour, which preferably is a dark colour and more particularly black or an almost black-looking colour. Then, the wood pattern is determined solely by the zones of different gloss degree. The advantage is that in this manner, substantially only one colour is necessary and that very dark wood can be represented.

In a preferred form of embodiment, however, the decor shall be performed in at least two different colours, whereby these colours preferably also represent a wood pattern. In other words, the floor panel then shall show two kinds of zones, which differ from each other by their colour. In the most preferred form of embodiment, the decor per floor panel will be realized exclusively in two colours. By "two colours" is meant that globally, from a normal eye height, substantially two colours are distinguished. Preferably, each colour is monochromatic, however, it is also possible to compose "one colour" as such of several colours, such as, for example, in four-colour printing or by applying colour specks mixed together, which globally render a single well-defined colour impression. Also, at the location of the transition between two colours, a thin zone of another colour may be present, which, however, can not be distinguished by the user from normal eye height.

It is noted that, when producing such floor panels, nevertheless a number of different floor panels can be manufactured, of which not only the design in the pattern differs, but also the colour or general tint differs somewhat, such that, when installing a floor, minor differences in respect to tint are visible among different panels in respect to each other.

Preferably, the aforementioned two colours shall differ at least in that the one colour is darker than the other. In the most preferred form of embodiment, the darkest colour is black or almost black, or generally a particularly dark colour is used for this colour. In a practical form of embodiment, black, in which a dark bordeaux tint is incorporated, will be used. Preferably, the other colour, too, is relatively dark. Particularly good results are obtained when for this other colour brown, more particularly dark brown, or a grayish colour are chosen. In a practical form of embodiment, in this brown or grayish colour preferably also a rosy tint will be incorporated.

An advantage of providing the panel with a wood pattern that is formed by the gloss degrees, as well as of a wood pattern that is formed by colours, consists in that a person standing on a floor composed of such floor panels, almost always will observe a pattern, irrespective of the angle of the incident light. When this person is looking at panels in front of him, inclined against incident light, he will, due to the reflection of the light on the synthetic material surface, distinguish little or nothing of the pattern formed by the colours, but he will clearly distinguish the pattern created by the different gloss degrees. However, when looking straight or almost straight at the panels, and if there is only inclined incident light, he will hardly see the pattern formed by the gloss degrees, but will well distinguish the pattern formed by the different colour zones.

According to an important preferred form of embodiment, the zones of different gloss degree and the zones of different colour are corresponding or substantially corresponding to each other. In connection therewith, it is noted that, with a reflection of light in such an angle that the different gloss degrees are clearly distinguishable, the matte portions substantially are seen as lighter portions, which presumably can be explained by the diffuse distribution of the light. By having the matte zones correspond to the lighter colour zones, is obtained that, when changing the viewing angle or viewing direction towards a condition where the differences in colour become more distinguishable and the differences in gloss degrees become less distinguishable, no sudden shift of the observed "light-coloured zones" will take place.

A practical example of an eventually intended deviation consists in that the zones of a well-defined gloss degree are made somewhat larger than the corresponding zones of a well-defined colour. In tests, hereby it was determined that thereby certain undesired shimmering effects, which obscure the final image, can be excluded.

A particular beneficial combination of characteristics consists in that, on one hand, as aforementioned, two colours are applied, which differ from each other in that one colour is lighter than the other, and that, on the other hand, the zones with the gloss degree resulting in the most matte effect, correspond to the zones that are performed in the lighter colour. For clarity's sake, it is to be noted that by a "lighter colour", a colour is intended that is lighter than the other colour, which, however, does not mean that the "lighter colour" has to be a bright colour. As aforementioned, this colour preferably even is also relatively dark, for example, brown, and still better relatively dark brown or a grayish colour.

In respect to the above, it is noted that, with a reflection of light under such an angle that the different gloss degrees are well observed, the matte portions substantially are experienced as lighter portions, which presumably can be explained by the diffuse distribution of the light. By now having the matte zones correspond to the less dark zones, it is obtained that, when changing the viewing angle or viewing direction towards a condition where the differences in colour become more distinguishable and the differences in gloss degrees become less distinguishable, no sudden shift of the observed "light-coloured zones" will take place.

In the most preferred form of embodiment, the matte zones are made larger than the zones realized in the aforementioned lighter colour, such that there is an overlap at the edges, whereby the matte zones extend up into the edge region of the darker zones.

Preferably, the aforementioned zones of different gloss degree each in their turn are flat, with the exception of a possible fine matting structure on the more matte zones, and with the exception of possible local embossments, such as, for example, embossments for imitating wood pores. Rough structures, such as ribs lying on the surface, which imitate wood nerves, thus preferably are excluded. As rough structures within each of the zones thereby are substantially excluded, it is avoided that the pattern formed by the zones of different gloss degree is impaired, which might have a disadvantageous influence on the intended effect.

The two kinds of zones, the glossy as well as the matte ones, preferably as such have a surface roughness that, in general, is smaller than 1 μm Ra, with the exclusion of possible unevennesses due to the imitation of wood pores.

According to a preferred form of embodiment, the aforementioned zones of different gloss degree substantially are located in the same plane, thus, at the same level. More particularly, it is preferred that the aforementioned zones of different gloss degree are obtained by means of a pressing with the same press plate and that these zones are located in the same plane, with the exception of a possible level difference, which is exclusively resulting from the fact that a matting structure has been provided on the press plate at the respective location. Mostly, such matting structure is formed by locally blasting the press plate, for example, sandblasting it.

When, for which reasons whatsoever, there is a level difference between the aforementioned zones of different gloss degree, it will preferably be smaller than 0.01 mm and even better will be smaller than 0.005 mm.

The fact that no level differences are applied, or only minor level differences, as explained heretofore, offers the advantage that no visible or almost no visible height differences manifest themselves, which is advantageous when looking vertically or almost vertically downward on such floor. In most of the practical applications, the matte and less matte structures of the respective zones are difficult to distinguish from such angle of view. As there are no substantial differences in height, consequently no transition can be discerned, as a result of which the decor is not disturbed. This is particularly important in the case that zones of different gloss degrees and colours are used, whereby the matte zones are made somewhat larger than the colour corresponding thereto. If, in such case, there were major height differences forming transition edges, which were well visible from a close distance, then it would be particularly visible that they do not precisely coincide with the transitions between the colours, which might be experienced as disturbing.

When height differences are excluded or are limited to a minimum, moreover the advantage is created that the required press plates can be realized in rather a simple manner.

The above, however, does not exclude that it is still possible to intentionally provide larger height differences, for example, in order to create special effects, or when the aforementioned disadvantage is considered as secondary.

In the upper surface of the floor panel, also embossments may be present, which imitate wood pores. In such case, it is preferred that these embossments correspond to the wood structure, which as such is a technique known under the denomination "registered embossed".

As aforementioned, the invention offers a technique, which is particularly suited for imitating dark wood species, in which little colour differences can be discerned, which consequently are difficult to imitate in a proper manner by solely using a printed decor. By using, in accordance with the inventive idea, global wood structures represented by means of different gloss degrees, indeed good imitations are possible, which is improved by, as aforementioned, also making use of differently coloured, however, corresponding zones.

In a practical application, the invention thus shall be applied for imitating the wood species Wenge, whereby then, of course, wood patterns are applied that are comparable to Wenge, and still better wood patterns that are derived or copied from real Wenge, for example, by means of reproduction techniques known in themselves, whereby, for example, the press plates to be applied are etched on the basis of photographic reproduction techniques.

Although the invention shows its advantages in particular when imitating Wenge, it is also very suitable for imitating certain other wood species, and in particular exotic wood species.

Due to the technical possibilities offered by working with different gloss degrees, preferably combined with different colours, particularly good imitations are possible.

It is noted that imitating a wood pattern by using different gloss degrees is particularly advantageous with relatively large alternating matte and glossy zones and/or zones of different colour, in particular, when those zones represent a so-called flower structure of wood.

Preferably, each floor panel shall have a single continuous wood structure, or, in other words, each floor panel shall represent the imitation of a single one-piece plank. According to a variant, however, it is not excluded that several planks, strips, laths or the like are represented on a single floor panel.

Laminate panels that are provided with dark decor layers often have the disadvantage that, after the installation thereof, noticeable light-coloured seams are visible between the floor panels. These are the consequence of cutting the top layer during forming, more particularly milling, of the edges. By cutting the top layer, presumably alterations in the refractive index of the resin are created or the cut paper is more noticeable. In order to avoid the possible occurrence of such light-coloured seams, it is possible, if desired, to perform a coloration at the upper edge of the floor panels, with a colour, the tint of which preferably corresponds to the general tint of the decor, either in that at least at the height of the lateral edge of the top layer, a colorant is provided, or in that a material portion at the height of the upper edge is removed, whereby the formed surface is provided with a colour.

In principle, the invention can be applied with any type of laminate floor panel that has a decor and a laminate layer of synthetic material, irrespective where the decor is situated in respect to the laminate layer, which consists of synthetic material, and irrespective how the laminate layer, consisting of synthetic material, is realized or constructed.

Substantially, however, not limitative, the invention in fact is intended for laminate floor panels of the type formed by a board that is laminated by means of pressing, and more particularly for floor panels of the so-called DPL type (Direct Pressure Laminate).

However, the invention can also be applied with other types of floor panels, for example, whereby the laminate layer is constructed of HPL, as well as with so-called compact laminate.

In particular, the invention is intended for being applied with laminate panels with a top layer of thermosetting resin, more particularly thermosetting melamine resin.

Preferably, the decor consists of a print that is applied on a carrier, for example, a paper layer, which is situated in the top layer of synthetic material, as this is usual when realizing DPL, HPL or compact laminate. However, it is not excluded that the print is realized in another manner, for example, by printing it directly onto an underlying substrate, whether or not by the intermediary of primers, sealing layers or the like.

It is noted that a "decor" in the broadest sense must be understood as a layer consisting of a colouring substance applied by means of any technique. Hereby, this may be, for example, a substance applied by means of a classical printing technique, a print formed by means of a printer, for example, a digital printer, as well as a layer formed by colorant, lacquer, ink or other hardening substance, no matter how these products are applied.

According to a deviating variant of the invention, instead of the decor defined herein above, use is made of a coloured laminate layer. In the case that the laminate layer comprises layers, for example, payer layers, embedded therein, coloured paper can be used, in other words, whereby colorant has been added to the paper during the production thereof, or whereby the paper is impregnated with a colorant. Also, coloured synthetic material, for example, coloured resin, can be used.

It is noted that in the case that zones of different colour are used, these, as mentioned above, preferably extend according to a wood pattern. This does not exclude other possibilities of colour ranges. So, for example, the decor might be provided with a spotted pattern, for example, of merging spots in black and another colour, for example, brown; or, for example, with a black background, in which spots in another colour are present, this, for example, as an alternative for a monochrome, for example, black, decor, whereby then the zones of different gloss degree are realized in the form of a wood pattern, thus, without corresponding to the colour pattern.

According to a preferred form of embodiment, in the case that the floor panel has a dark decor, use is also made of a transparent, however, dark-tinted material layer on top of this decor. Thereby, the decor obtains a fuller tint. By applying such coloured material layer, the decor, when consisting of ink or the like, will not necessarily provide a very good covering power any more. Good covering power sometimes is a problem with dark colours, and by using a coloured, however, transparent material layer on top of the decor, this problem now is excluded or minimized.

The coloured material layer can be realized in different ways.

On one hand, prior to the actual manufacturing of the boards of which the floor panels are formed, colorant can be blended with the aforementioned synthetic material itself, for example, in the resin, i.e. the usually applied melamine resin. In this manner, the laminate layer itself will function as a coloured material layer.

On the other hand, in the case that a so-called overlay is present on top of the printed decor, also the carrier material of the overlay can be a coloured material, for example, paper, to which an amount of dark colorant has been added. As known, the paper of the overlay becomes transparent as a consequence of pressing. However, the colorant present therein remains visible, such that a transparent, coloured material layer is created.

It is also noted that the sum of the surfaces of the zones mentioned heretofore, per kind of zone, preferably covers a substantial part of the entire surface of the floor panel and preferably covers at least 25% thereof.

For clarity's sake, hereby, for example, is meant that the sum of the surfaces of all zones of a certain gloss degree, thus, on the one hand the sum of the surfaces of all matte zones, and on the other hand the sum of all surfaces of the more glossy zones each time is not less than 25% of the entire surface of the floor panel.

It is noted that the decor as such can be formed of a plurality of layers. With dark colours, for example, it is preferred that for constructing the decor, first a ground is formed, after which the decorative ink or another substance is provided thereupon.

It is clear that, as aforementioned, performing a coloration on the upper edge of floor panels may be applied to any laminate floor panel, for example, in order to mask undesired visual effects at the location of the seams, where two floor panels adjoin against each other, such as the aforementioned noticeable light-coloured seams. According to a second independent aspect, the invention thus also relates to a floor panel, whereby this floor panel comprises a decor, as well as a top layer or laminate layer on the basis of synthetic material, whereby this floor panel, at least at two opposite sides or edges, is provided with coupling parts allowing that two of such floor panels can cooperate with each other at these sides, and whereby this floor panel, at the aforementioned sides, at the location of the aforementioned top layer or laminate layer, shows upper edges intended to adjoin against each other when two of such floor panels cooperate with each other, with the characteristic that the aforementioned upper edges, at least at the height of the lateral edge of the laminate layer, are coloured.

By "adjoin", here is meant that, for a user, on first sight the upper surfaces of the respective floor panels rest against each other, which does not exclude that in reality there may be a limited intermediate space between the two upper edges, for example, smaller than 0.5 mm, for example, as a result of production tolerances, such as an intermediate space as a result of a lack of parallelism or straightness of a side. In other words, this relates to floor panels having no particular provisions at their upper edges, by which visually an intentional and clear recess is created in the obtained floor surface when two of such floor panels are installed against each other, such as recesses obtained in that one or both of the floor panels are provided with a chamfer or the like.

According to the second aspect, the invention is particularly useful when the top layer or laminate layer, at the location of the aforementioned upper edges, is cut substantially vertical, for example, precisely vertical or with a very small undercut, in respect to the plane of the floor panel. With floor panels with such vertically cut upper edges, the aforementioned light-coloured seams then mostly are experienced as very disturbing, whereas, when these are coloured with a suitable colour, this disadvantage is remedied or is at least minimized.

Preferably, the floor panel is rectangular and shows, at both pairs of opposite edges or sides, at the location of the aforementioned top layer or laminate layer, upper edges, which are coloured at least at the height of the lateral edge of the laminate layer. However, it is possible that such coloration is not performed at a second pair of upper edges of the floor panel and/or that other provisions are taken at these edges in order to limit or to prevent the occurrence of undesired visual effects; so, for example, a chamfer or the like may be formed at the respective upper edges, which is provided with a layer of colour or another decor layer.

In a particular preferred form of embodiment, the floor panel is rectangular and shows at its two short sides, at the location of the aforementioned top layer or laminate layer, upper edges that are coloured, and at both its long sides a chamfer covered with a decorative layer.

From the above, it is clear that such coloration, amongst others, can be useful for floor panels showing the characteristics of the first aspect of the invention.

According to its second aspect, the invention also is particularly useful with floor panels, the decorative side of which imitates slate or another flake-shaped kind of stone and whereby the upper side of which has terrace-shaped embossments. By "terrace-shaped embossments", embossments must be understood showing at least two stepwise transitions in the same direction, either downward, or upward, between substantially continuous embossments or terraces. Due to the possible presence of such embossments on the upper edge of such floor panels, height differences between adjacent floor panels in a floor covering may occur, which, if the second aspect is not applied, will lead, amongst others, to an increased visibility of said noticeable light-coloured seams.

It is, however, clear that the invention according to the second aspect thereof is also useful with other floor panels. Avoiding undesired visual aspects is advantageous for any floor covering. Therefore, the invention also applies for other floor panels than those showing the characteristics of the first aspect, and it also applies for other floor panels than those with a decorative side imitating slate or another flake-shaped kind of stone and whereby the upper side thereof has terrace-shaped embossments. The invention may be applied, for example, also to floor panels having no embossments and/or differences in gloss degree at their upper surface, or to floor panels imitating scraped wood by means of their decor and pertaining embossments.

The invention is in particular intended for floor panels having a laminate layer or top layer of the DPL or HPL type, whereby undesired visual effects at the location of the seams, where two floor panels adjoin each other, then are masked by means of the aforementioned coloration.

It is clear that the invention is particularly advantageous with any floor panel that is provided with a dark decor layer, such as, for example, with a floor panel imitating a naturally dark species of wood, such as Wenge, Jatoba, and so on, a dark-varnished wood species, a dark kind of stone or the like, as the aforementioned light-coloured seams there will show in an aggravated manner. It is, however, clear that the invention, according to its second aspect, is not limited to floor panels provided with a dark decor layer. The invention also relates to floor panels that are provided with a light-coloured decor layer, such as, for example, floor panels imitating a naturally light-coloured wood species, a species of wood treated with a light-coloured varnish, a light-coloured kind of stone or the like.

According to a possible form of embodiment, the tint of the coloration corresponds to the general tint of the decor and/or to the tint of the decor at the location of the edge region of the floor panel. This does not exclude that any other colouring tint can be applied, such in function of the desired effect.

In a particular, preferred form of embodiment, the tint is darker than the general tint of the decor, or at least darker than the general tint of the decor at the edge of the floor panel. So, for example, does the application of a darker colorant, such as black, for colouring the upper edge of floor panels with a lighter-tinted decor, contribute to the accentuation of separate floor panels in a floor covering, which leads to a more natural appearance of a floor covering that is composed of several of such coloured floor panels. It is noted that the masking of the aforementioned undesired visual effects here relates to masking the white seams by letting them show as dark or black in the floor covering, which is experienced as less disturbing, and in some cases, even as more natural, than white seams.

In another preferred form of embodiment of the second aspect of the invention, the tint of the coloration corresponds to the tint of the represented wood pores on the decorative side of the floor panel. So, for example, a floor panel imitating the wood species Merbau preferably is provided with a dark, for example, black, coloration, as the wood pores of this wood species also show as dark or black in the globally rather lighter-coloured wood.

The coloration may be performed in any manner, such as, for example, with a felt-tipped pen, however, preferably is performed with a hardening, more particularly drying, colorant, which is provided in liquid form and subsequently is hardened, for example, with ink, lacquer or colour.

In a particular, preferred form of embodiment, the coloration is the result of spraying or jetting the colorant onto the upper edge and preferably consists of a print performed by means of an inkjet printer supply system, which guarantees for a flexible and/or robust coloration. A jet of colorant or inkjet created by an inkjet printer or the like can be controlled in a simple manner and therefore can be optimally employed in an automatic production process. It is noted that the aforementioned jet of colorant comprises any form of jet, whereby colorant is sprayed onto the surface to be coloured, whereby such jet may be composed of atomized particles, droplets, as well as a continuous jet of liquid.

In other preferred forms of embodiment of the second aspect, the applied coloration has special features; so, for example, it may have waterproofing features, friction-reducing features, adhesive features, antistatic features, or the like. The aforementioned antistatic features enable an easy dissipation of electric charges occurring on or in the top layer of a floor panel over the entire floor covering. The aforementioned friction-reducing features may increase comfort when installing a floor covering consisting of such floor panels, for example, when, during installation and/or removal of the floor covering, it is possible and/or necessary to shift the floor panels in mutual respect.

According to a third independent aspect, the present invention aims at a simple and/or inexpensive and/or flexible method for manufacturing floor panels showing, for example, the characteristics of the second aspect. To this aim, the present invention relates to a method for manufacturing a floor panel, whereby this floor panel comprises a decor, as well as a top layer or laminate layer on the basis of synthetic material, whereby this floor panel, at least at two opposite sides or edges, is provided with coupling parts allowing that two of such floor panels can cooperate with each other at these sides, characterized in that the floor panels, at one or more upper edges, at least at the location of the top layer or laminate layer, are provided with a coloration by spraying a hardening substance onto these upper edges, by means of an inkjet printer supply system.

By "inkjet printer supply system", in first instance a supply system is meant whereby droplets of the aforementioned substance are generated, whereby these droplets are electrostatically charged and, whether or not, are deviated under the influence of a magnetic field while moving into the direction of the receiving medium, in this case, the respective upper edge of the floor panel. Such systems are known as such for printing data, such as production data, onto the rear side of a floor panel. Of course, it is also possible to apply inkjet printer supply systems that work according to possible other principles.

Such inkjet printer supply systems allow, for example, to form a fine mist of ink droplets, such that the upper edges can be coloured without substantially protecting, for example, the decorative side of the floor panel. The possibility of deviating the jet created by an inkjet printer supply system provides for that a large number of usage possibilities, which are useful in the manufacture of floor panels, are available by means of the same supply system.

As explained above, an inkjet supply system can be automated in an easy manner, and employing such system, according to this third independent aspect, leads to a flexible and/or inexpensive method for manufacturing better finished floor panels, more particularly floor panels leading to less or no undesired visual effects in a floor covering.

Preferably, ink is used for the aforementioned hardening substance, which results in a thin layer of colour, which in no case, for example, even if the respective upper edges are intended for adjoining against each other, can hinder the coupling of the respective floor panels.

According to a possibility, the method is applied with floor panels of which the top layer or laminate layer, at the location of the aforementioned upper edges, is cut substantially vertical in respect to the plane of the floor panel.

According to another possibility, the method is applied with floor panels provided with a chamfer or the like at their upper edges, whereby the surface of this chamfer is coloured substantially by means of said substance, such, according to the third aspect, by means of the aforementioned inkjet printer supply system.

In both possibilities mentioned above, when providing the aforementioned coloration, preferably use is made of a moving inkjet, or a jet of another substance, whereby the direction is controlled such that the jet covers a well-defined operating area, such while the floor panels are moved with the upper edge to be coloured along the operating area, such that a good coverage of the respective upper edge with the aforementioned substance is obtained.

The invention is particularly advantageous with floor panels, the top layer or laminate layer of which is of the DPL or HPL type. Hereby, undesired visual effects at the location of the seams, where two floor panels adjoin against each other, then are masked by means of the aforementioned coloration.

It is not excluded that for forming a coloration at the same upper edge two or more jets, preferably originating from different inkjet supply systems, are used simultaneously. These jets are preferably established at different angles, such that a good coverage of the respective upper edge is obtained.

BRIEF DESCRIPTION OF THE DRAWINGS

With the intention of better showing the characteristics of the invention, hereafter, as an example without any limitative character, several preferred forms of embodiment are described, with reference to the accompanying drawings, wherein.

DETAILED DESCRIPTION OF THE PREFERRED EMBODIMENTS OF THE INVENTION

Figure 1:
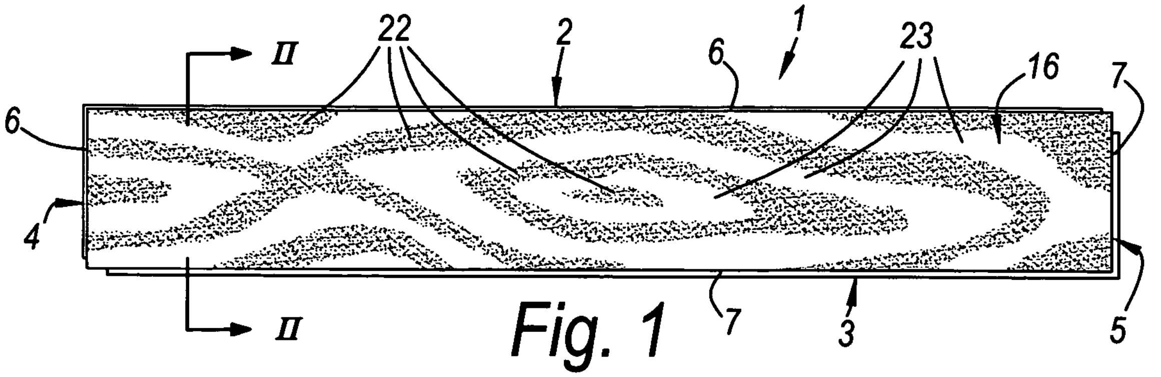
FIG. 1 schematically represents a floor panel according to the first aspect of the invention.

As represented in FIG. 1, the invention, amongst others according to its first aspect, relates to a floor panel 1 of the type intended for forming a floating floor covering.

Figure 2:
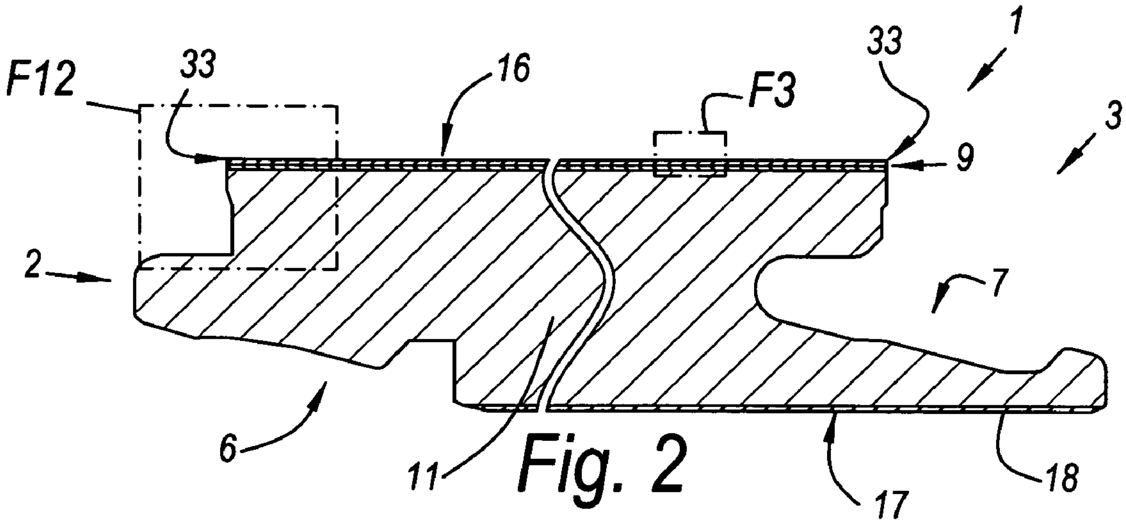
FIG. 2, schematically and at a larger scale, represents a cross-section according to line II-II in FIG. 1.

As represented in FIGS. 1 and 2, this floor panel 1 preferably, at least at two opposed edges 2-3, and preferably at both pairs of opposed edges 2-3 and 4-5, is provided with coupling parts 6-7, with which a plurality of such floor panels 1 can be coupled to each other. As represented, these coupling parts 6-7 preferably are of the type that, in coupled condition of the floor panels 1, effects a locking in vertical and horizontal directions. According to variants, other types of coupling parts, for example, coupling parts in the form of a normal tongue and groove, or coupling parts for realizing a so-called "drop-in" coupling, are not excluded. The coupling parts do not necessarily have to be manufactured in one piece with the body of the floor panel. Combinations of several types of coupling parts at various pairs of edges are possible. Examples of coupling parts are known, amongst others, from WO 97/47834, WO 01/96688, WO 01/96689, WO 01/98603, WO 96/27719, WO 00/20705, WO 00/47841, WO 98/58142 and JP 07-300979.

Figure 3:
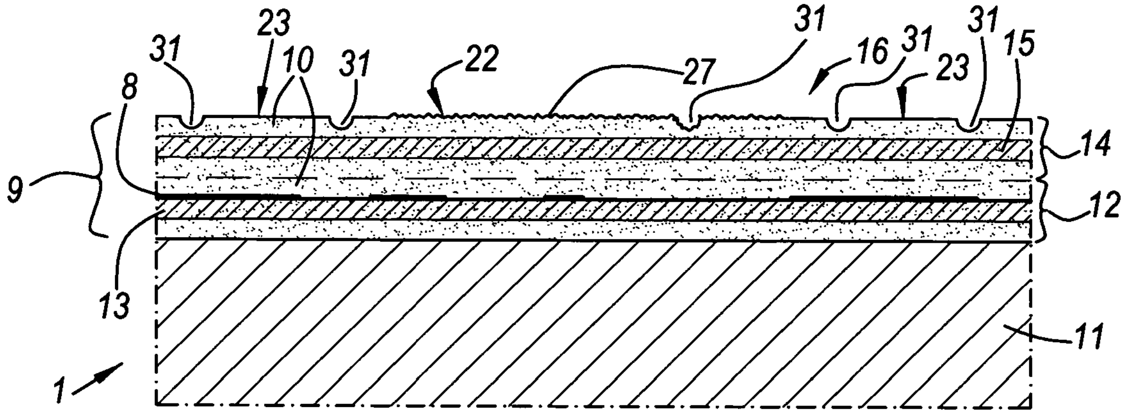
FIG. 3, at a highly enlarging scale and in a schematic manner, represents the portion indicated by F3 in FIG. 2.

As represented in FIG. 3, the floor panel 1 comprises at least a printed decor 8 and a laminate layer or top layer 9 on the basis of synthetic material 10, as well as an underlying substrate 11.

In the represented example, the laminate layer 9 is of the DPL type (Direct Pressure Laminate) and, to this aim, is composed of two layers pressed upon each other and upon the underlying substrate 11, namely a first layer, hereafter named decor layer 12, which consists of a carrier 13 impregnated with synthetic material 10, more particularly resin, for example, a carrier of paper, upon which the decor 8 is provided in the form of a print or the like, and a second layer, namely a so-called overlay 14, which, in the example, also consists of a carrier 15 impregnated with synthetic material 10, more particularly resin. Mostly, the carrier 15 consists of pure and clear paper, which, when being pressed, becomes transparent. Materials increasing the wear resistance of the final laminate layer 9 may be taken up into the overlay 14 in a known manner.

Of course, the laminate layer 9 is located at the decorative side or the upper side 16 of the floor panel 1. As represented in FIG. 2, usually a backing layer 18 will be present against the underside 17 of the floor panel 1, which backing layer also consists of a laminate layer.

The floor panels 1 are manufactured in a known manner of large laminate boards, which are sawn to floor panels 1, after which at the edges thereof coupling parts, for example, the represented coupling parts 6-7, are formed, for example, by means of a number of milling processes.

Figure 4:
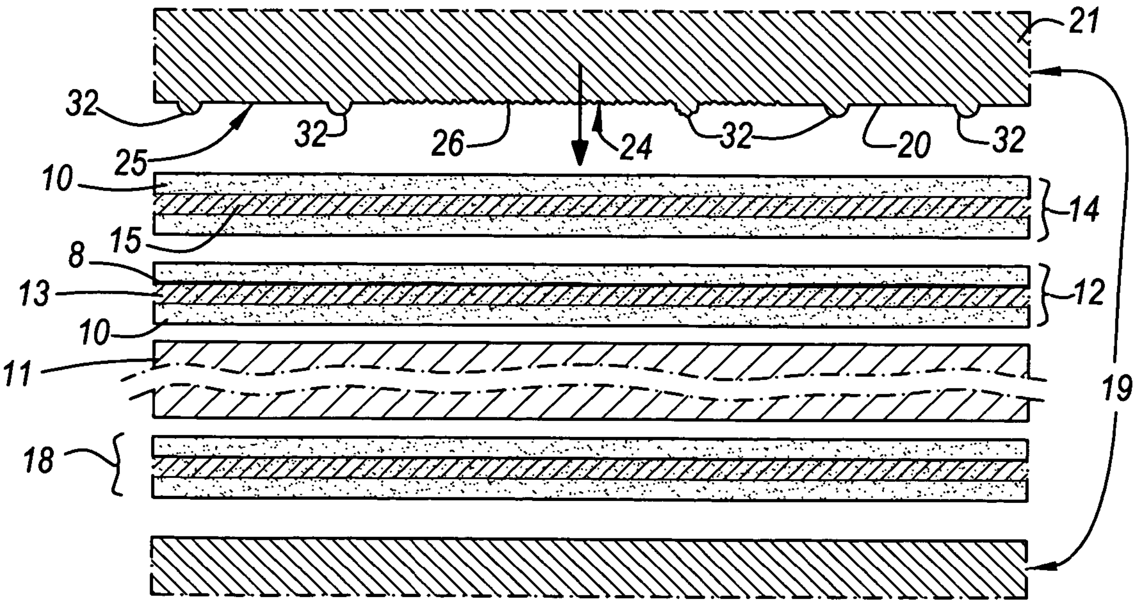
FIG. 4, highly schematic, represents how boards are composed, of which floor panels, such as the one from FIGS. 1 to 3, can be realized.

The laminate plates as such are manufactured, for example, as schematically represented in FIG. 4, by pressing different composing layers under high pressure in a heated press 19, whereby, for example, the decor layer 12, the overlay 14 and the backing layer 18 are pressed upon the substrate 11 and thereby harden. The structure of the upper surface of the plate and thus also of the upper side of the floor panels is determined by the structure of the contact surface 20 of a press plate 21 used in the press 19. Such press plate 21 is better known by the denomination of "platen".

The particularity of the first aspect of the present invention consists in that, as schematically represented in FIG. 1, the floor panel 1, at its upper side 16, shows zones 22-23 of different gloss degrees extending over the upper surface, globally in the form of a wood pattern. These zones 22-23 are distinguishingly depicted in FIG. 1 by means of hatched and non-hatched regions, whereby the hatched regions represent zones 22 with a first well-defined gloss degree, whereas the non-hatched regions represent zones 23 with a clearly different gloss degree. More particularly, the hatched regions represent zones 22, which, to the naked eye, are seen as matte zones, whereas the non-hatched regions rather are glossy.

Although it is not excluded to make use of different regions with more than two mutually differing gloss degrees, preferably, as represented in FIG. 1, exclusively zones 22-23 of only two clearly distinguishable gloss degrees are applied. Hereby, it is intended that, by the naked eye, from a normal eye height above an installed floor panel 1, only two clearly different gloss degrees can be distinguished.

The different gloss degrees can be realized in any manner. Preferably, however, to this aim a press plate 21 is used, which, as schematically represented in FIG. 4, is provided with a contact surface 20 also having zones 24-25 of different gloss degree. The zones 25 with the highest gloss degree are substantially smooth, whereas the zones 24 with the lowest gloss degree have a fine non-smooth structure 26, which has been obtained, for example, by blasting, for example, sand-blasting, the press plate 21 at the height of the zones 24. After pressing, thus, in the zones 22 a fine non-smooth structure 27 is retained in the upper surface of the pressed board, which is schematically represented in FIG. 3. Visually, this non-smooth structure renders a matte effect. Due to the fine non-smooth structure 27, the reflection of light in fact takes place in a diffuse manner, whereby a more matte appearance is created.

It is noted that the technique to perform a pressing with a fine non-smooth surface in order to retain a matte surface at the formed plate, as such is known from the prior art.

According to any of the possibilities of the first aspect of the invention mentioned in the introduction, the floor panel 1 has a decor 8 that is performed in one colour or substantially in one colour, which preferably is a dark colour. This then means, for example, that in FIG. 1 no colour pattern can be observed at the upper surface and that only the pattern is visible that is the result of the application of two gloss degrees. Hereby, the colour of the decor 8 preferably is black or is viewed as nearly black.

Figure 5:
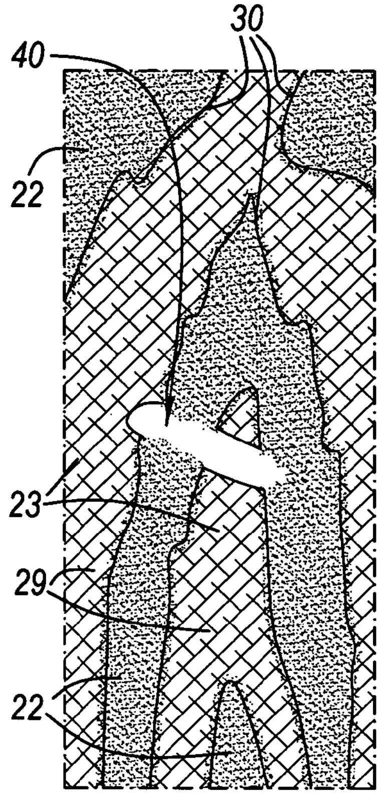
FIG. 5, for a variant of the first aspect, schematically represents a portion of the upper side of the panel.

In FIG. 5, schematically a portion of the upper surface of a preferred variant of a floor panel 1 according to the first aspect of the invention is represented, whereby the decor 8, however, is performed in two different colours, in other words, the decor 8 has two kinds of zones 28-29 differing from each other by their colour. Still more particularly, in the embodiment of FIG. 5 the zones 22-23 of different gloss degree and the zones 28-29 of different colour correspond to each other.

Figure 6:
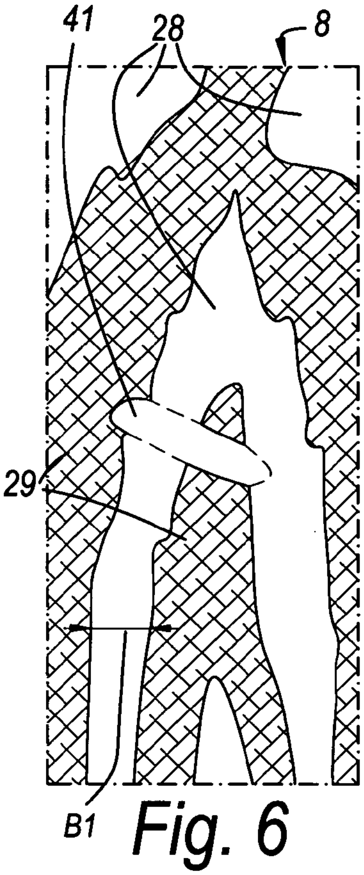
FIGS. 6 and 7 show how the portion of FIG. 5 is composed.
Figure 7:
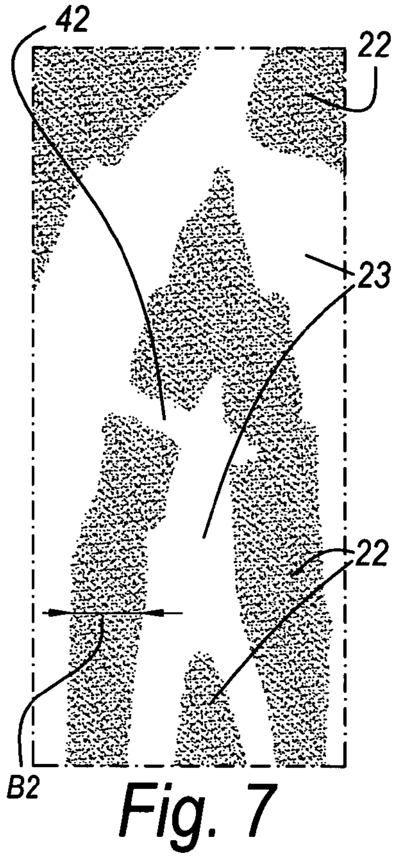

FIGS. 6 and 7 illustrate how the portion of the upper surface represented in FIG. 5 is constructed.

FIG. 6 shows the zones 28-29 of different colour, whereby, as is visible in this figure, these zones 28-29 also represent a wood pattern. The two colours differ from each other in that the one colour is darker than the other, whereby the darkest colour preferably is black, whereas the lighter colour is brown or brownish. In FIG. 6, the zones 29 that are performed in the darkest colour are provided with a hatching, whereas the blank regions in the figure represent the zones 28 that are performed in the lighter colour, for example, brown.

FIG. 7 represents, for the corresponding portion of FIG. 6, the zones 22-23 of different gloss degree. Hereby, it is noted that the zones 22 with a gloss degree giving the most matte effect, which are hatched in FIG. 7, and the zones 28 that are performed in the lighter colour, which are blank in FIG. 6, are made corresponding to each other. By "corresponding" is meant that the same wood pattern, approximately the same wood pattern, or wood patterns globally extending in the same manner, are applied for the zones of different colour and of different gloss degree. Further, preferably hereby is also meant that the zones 22-23 on the one hand and 28-29 on the other hand are present on corresponding locations on the upper side, at least in respect to the larger zones; in other words, that the wood pattern created by the gloss degrees and the wood pattern created by the colours are positioned correspondingly or approximately correspondingly on top of each other.

The above does not exclude that deviations may exist, whether or not intended. So, for example, it is preferred that, as represented in FIGS. 5 to 7, the matte zones 22, or at least the larger portions thereof, are made larger than the zones 28 that are made in the aforementioned lighter colour. This means, for example, that the width B2, represented in FIG. 7, of the respective matte zone 22 is somewhat larger than the width B1, indicated in FIG. 6 for the same location, of the lighter-coloured zone 28. Hereby, an overlap 30 is created at the edges of the zones, whereby the matte zones 22 extend up into the edge region of the dark zones 29. This overlap may be several millimeters.

By providing for that the matte zones 22 extend somewhat wider than the corresponding coloured zones 28, it is obtained that, in case of a minor mutual shifting among the zones 22 and 28, for example, by extension of the carrier 13, still a good covering of the zones 28 by the zones 22 is obtained. Tests have shown that in this manner, undesired shimmering effects can be minimized.

In an even more preferred form of embodiment, also embossments 31 are provided in the upper surface of the floor panel 1, in other words, in the decorative side 16, said embossments imitating wood pores, which preferably correspond to the aforementioned wood pattern. In the cross-section of FIG. 3, several of such embossments 31 are illustrated schematically. It is clear that these, as is schematically represented in FIG. 4, can be realized by working with a press plate 21, upon which then the necessary protruding portions 32 are present.

Figure 8:
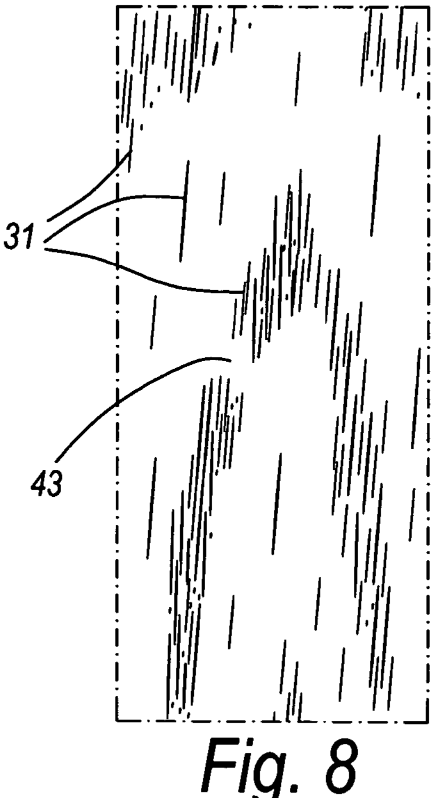
FIGS. 8 and 9 schematically represent similar portions as in FIGS. 5 to 7, however, for a further variant.
Figure 9:
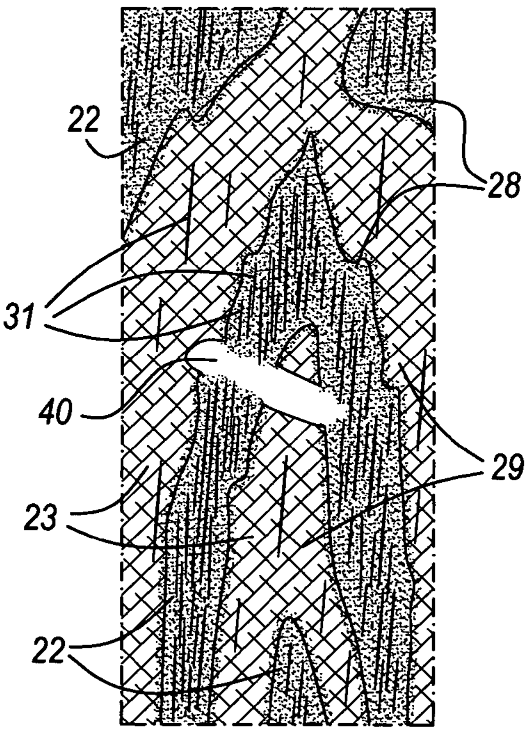

FIG. 8 schematically represents the pattern determined by the embossments 31, in top plan view for the portion of the surface illustrated in FIGS. 5 to 7, whereas FIG. 9 schematically represents the final effect, namely the application of the pore structure on the surface of FIG. 5.

By embossments that are "corresponding" to the aforementioned wood pattern is meant that the embossments 31 are established according to a pattern following the wood pattern or more or less following it. As with real wood, the wood pores hereby do not have to follow well-defined zones of different colours. When imitating a floor panel 1 according to the present invention, it is, however, preferred that the embossments 31 imitating the wood pores are situated largely in the matte zones 22, as illustrated.

For completeness' sake, it is noted that in FIGS. 3 and 4 the layers and surface structures, and, thus, also the embossments 31, are represented in a strongly schematised manner. In reality, the top layer or laminate layer 9 has a thickness of only, for example, 0.15 mm. The thickness of the embossments 31 does not have to be limited to the thickness of the overlay 14.

It is noted that it is not excluded to combine zones 22-23 of different gloss degree with embossments 31 imitating wood pores, without using different colours. This then, for example, means that the zones 22-23 of different gloss degree of FIG. 7 are combined with the pore structure of FIG. 8, however, on a neutrally coloured background, which then, for example, is formed by a dark, single-colour, more particularly black, decor 8.

As is represented in FIG. 3, the aforementioned zones 22-23 of different gloss degree preferably each in its turn are flat or substantially flat at their upper surface, with the exception of a possible fine matting structure 27 at the location of the more matte zones 22, and with the exception of possible local embossments, such as, for example, the aforementioned embossments 31 for imitating wood pores.

The aforementioned zones 22-23 of different gloss degree may be situated substantially in the same plane, thus, at one and the same level or almost the same level, as well as at different levels.

As represented in FIG. 3, the zones 22-23 of different gloss degree preferably, however, are situated substantially in the same plane, thus, at the same or almost the same level, with the exception of possible height differences, which are determined exclusively by the roughness of the structure 27. The fact that there is no level difference or almost no level difference between these zones 22-23, offers the advantage, already explained in the introduction, that no real raised transition edges can be observed, as a consequence of which a possibly disturbing factor is excluded.

Practically, it is preferred that, globally seen, a possible level difference is smaller than ten micrometers and even better less than five micrometers. In the case of unevennesses in order to create a matte effect, the intended level difference is the vertical height difference between the higher points of the peaks of the uneven structure 27 and the upper side of the less matte, or glossy, adjacent zone 23.

The above, however, does not exclude that in certain applications, yet larger level differences will be applied.

Figure 10:
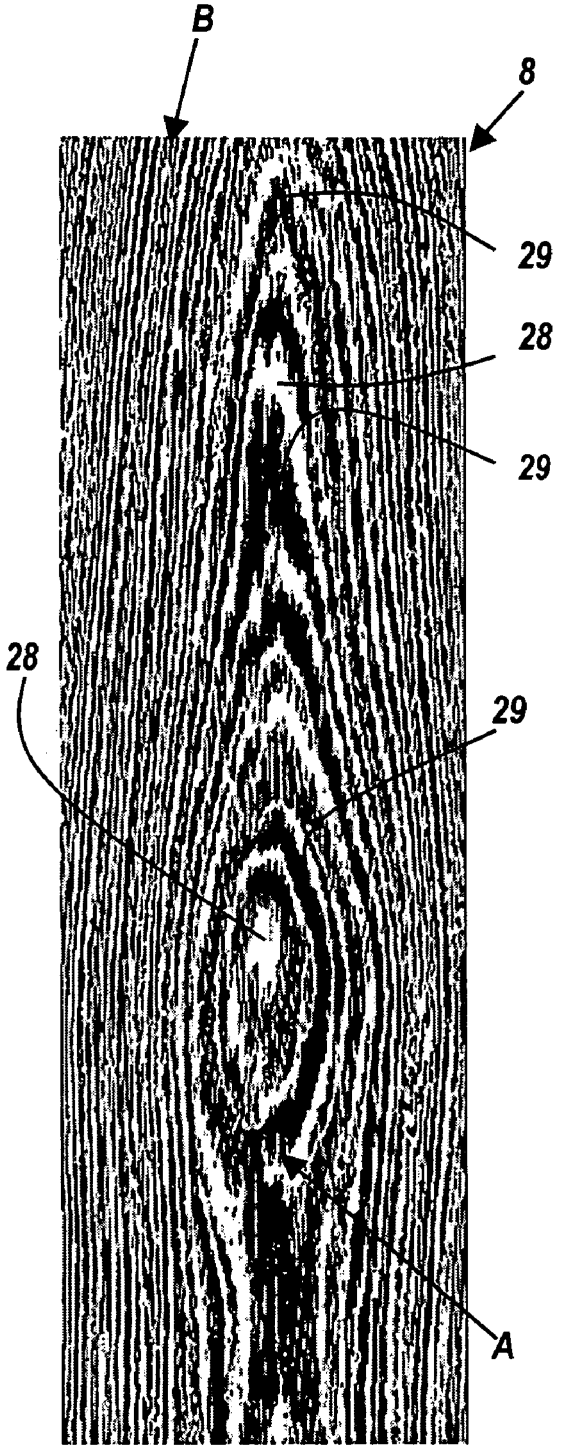
FIGS. 10 and 11 relate to a real form of embodiment of the first aspect of the invention, more particularly a form of embodiment representing a Wenge pattern.
Figure 11:
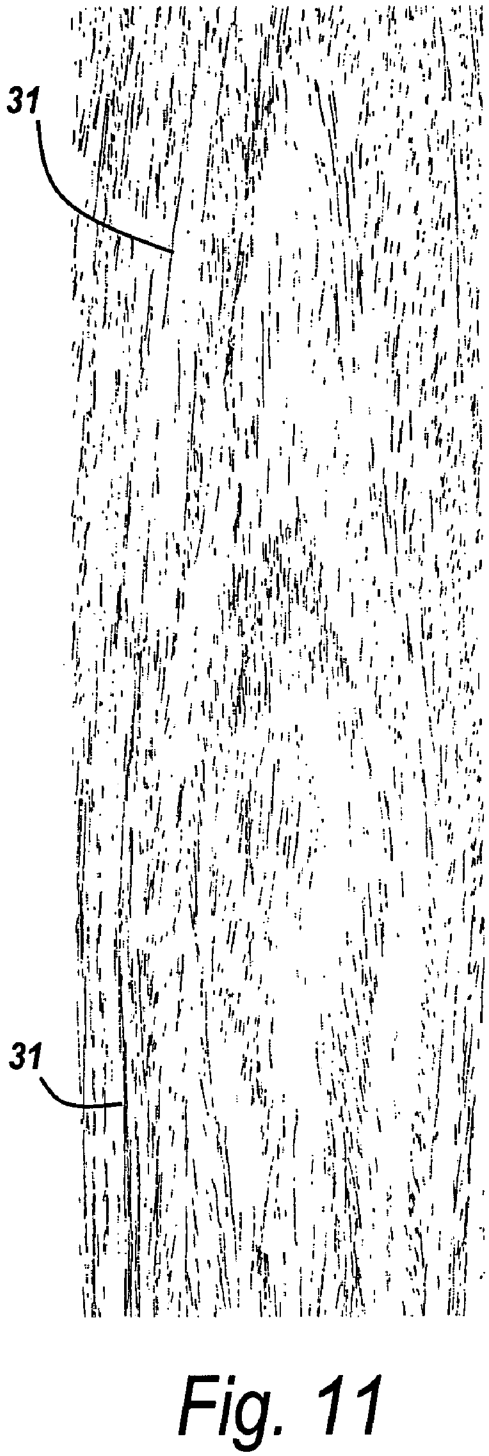

According to its first aspect, the invention is particularly suitable for imitating dark hard wood species, although the application with other imitations is not excluded. In first instance, it is intended for imitating the wood species Wenge. To show this more clearly, in FIG. 10 a portion of a real printing pattern for manufacturing a laminate floor panel imitating Wenge is represented. Herein, the darker portions represent the dark, preferably black, zones 29, whereas the blank portions represent the zones 28 of a lighter colour. The pertaining pattern of matte and glossy zones will be made in the same manner, whereby the blank regions in FIG. 10 then represent the matte zones 22, with possibly the only difference that an overlap 30, as aforementioned, will be applied. FIG. 11 represents a real embossment structure for imitating wood pores that matches FIG. 10.

When forming the aforementioned floor panels 1, in particular when forming the edges 2-3-4-5 and the coupling parts 6-7 present thereon, often light-coloured, practically white edge lines are created, such at the location where the cut is passing through the top layer, in other words, the laminate layer 9. Presumably, this is the result of alterations in the refractive index of the synthetic material 10, as a result of which the latter becomes white instead of transparent. Another assumption is that, at least with DPL, when cutting the carrier 13 of the decor layer 12 and/or of the carrier 15 of the overlay 14, a white edge becomes visible. Irrespective of what is the basis of this effect, it is noted that this is particularly annoying when applying very dark decors, such as Wenge, as, after having coupled such floor panels, noticeable light-coloured lines remain between the coupled floor panels.

Figure 12:
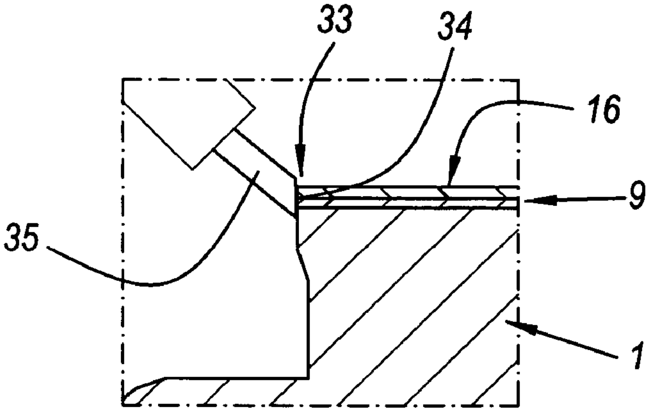
FIGS. 12 to 14, at a larger scale, represent the area indicated by F12 on FIG. 2 and illustrate a number of possibilities for finishing upper edges of a floor panel according to the present invention.
Figure 13:
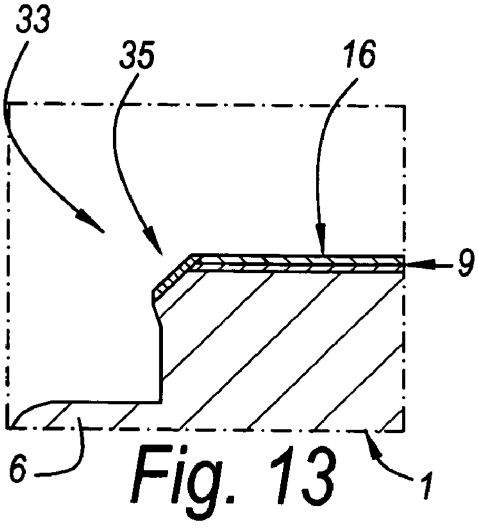
Figure 14:
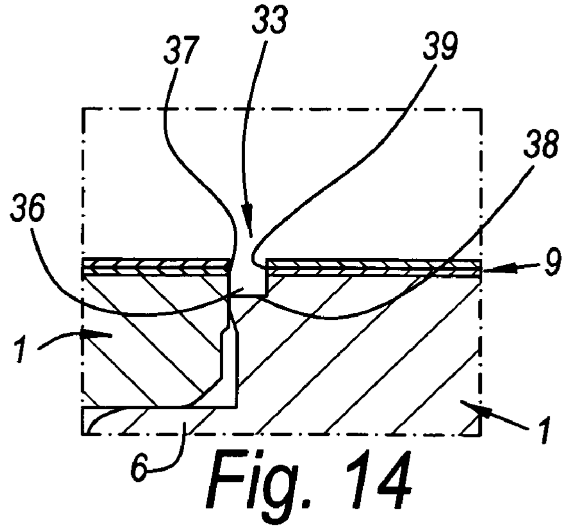

According to the first and the second aspect of the present invention, this is remedied in that at the upper edge 33, a coloration is performed, preferably with a colorant, the tint of which corresponds to the general tint of the decor 8. According to a first possibility, this is possible by providing a colour layer 34 in any manner at least at the height of the lateral edge of the laminate layer 9, which, in FIG. 12, is schematically represented in that the upper edge 33 is moved along a felt-tip pen 35, such that the lateral edge is coloured, for example, black. FIG. 13 represents a variant, whereby a material portion is removed at the height of the upper edge 33, for example, for forming a chamfer 35, and whereby the formed surface is provided with a colour layer 34. The colour layer 34, for example, black or brown, can be applied on the surface in any manner and consists, as represented, for example, of a covering layer formed by means of a colorant, such as lacquer, ink, or the like, or by means of transfer print or the like. FIG. 14 represents a variant, whereby a rectangular edge recess 36 is provided between coupled floor panels 1, whereby the bordering sides 37-38-39 then are coloured.

Possibly, the floor panel 1 may have a substrate 11 that is coloured, also with a dark colour, whereby optionally also the underside of the floor panel is tinted dark.

Hereby, optically the idea is given that the floor panel is a massive wooden plank.

It is noted that a coloured overlay 14 can be present above of the decor 8, which, in case of a dark decor 8, also is coloured dark.

It is also noted that the first aspect of the invention is especially advantageous with wood patterns, or imitations of wood, having a pronounced so-called flower structure. This is a structure whereby the respective zones, as represented in FIGS. 1 and 5 to 10, globally seen, extend in large successive band-shaped rings or parts of rings.

It is noted that by an "imitation" of a wood pattern, any form of representation of a wood pattern has to be understood, irrespective whether this is an imitated pattern obtained by means of reproduction techniques, whereby one started from an image of real wood, or this is a pattern generated by means of imaging and/or design techniques, without starting from real wood.

In the case of pressed laminate, the laminate floor panels 1 mostly are formed of larger pressed boards, whereby the decor layer 12 and the possible overlay 14, in the form of a wide paper web or paper sheet, mostly having a width of 2.5 meters, are pressed onto the substrate. Then, the obtained boards are sawn to floor panels 1. In the case of oblong floor panels 1, for example, as illustrated in FIG. 1, these mostly are sawn from the boards in the longitudinal direction of the paper web. According to a special aspect of the invention, in such case preferably a particular method will be applied for realizing the floor panels, whereby well-defined critical patterns substantially are realized from the central area of the paper web only, whereas from the edge areas substantially only floor panels with less critical patterns are realized. As a matter of fact, the paper web in the central area mostly is positioned rather accurate and moreover the possible strain does not have any influence. In the edge areas, however, the strain will manifest itself more clearly and may shift the pattern of the decor considerably. This has as a consequence that, when pressing the laminate boards, in the central area will be little or no mutual shifting among the colour pattern and the pattern of different gloss degrees, however, will occur in the edge areas. By now having the most critical patterns prevail exclusively in the central area of the pattern, it is obtained that the aforementioned disadvantage can be minimized.

This is further clarified below with reference to FIG. 10. As becomes clear from this figure, such floor panel 1 may posses zones A with large patterns, such as large "flowers", as well as zones B with rather a fine texture in the pattern. Now, such zones A prove to be more critical than zones B. Obviously, in zones A, a shifting among the colour pattern and the pattern of different gloss degree is more noticeable than in zones B. In view of the fact that mostly on one paper web several floor panels with different patterns are represented, whereby certain floor panels comprise pattern A as well as B, whereas others show no pattern A or hardly a pattern A, now, according to the invention, preferably it will be provided for that floor panels having, in an outspoken manner, a pattern of the A type, will be situated in the central area of the paper web only, whereas in the edge areas exclusively patterns of the less critical type are maintained, thus, floor panels having exclusively or almost exclusively the finer pattern B.

In the floor panel according to the first aspect of the invention, also possible so-called silver grains can be imitated, which, in reality, are glossy hard wood portions, mostly in the shape of a small spot or irregularly running ribbon. In FIGS. 5 and 9, schematically an example of such imitated silver grain 40 is represented.

In the above-described laminate floor panels 1, these silver grains can be imitated in a practical manner by applying one or more of the following technical characteristics:

- by applying a region in which a colour alteration has been performed, for example, in that in the region 41 of FIG. 6 a colour alteration is present, which:
  - either may consist in that, as represented, this region 41 is performed in the same colour as the zones 28, with as a result that this colour also extends up into the respective zones 29 and there, thus, effects a colour alteration;
  - or may consist in that this colour 41 is performed in the same colour as the zones 29, with as a result that this colour also extends up into the respective zones 28 and there, thus, effects a colour alteration;
  - or may consist in that the region 41 is performed in a colour which differs from the colour of the zones 28 as well as from the colour of the zones 29;
- by applying a region wherein an alteration, preferably an increase, in gloss degree is visible in respect to the surrounding region, for example, in that, as represented in FIG. 7, a region 42 is applied that extends up into the matte zones 22, however, is also performed with the same gloss degree as the zones 23, or, for example, in that, according to a variant, a region is applied where the gloss degree is even higher than that in the zones 23;
- by applying a region, for example, a region 43 as indicated in FIG. 8, in which the general pattern of the embossments 31 locally is interrupted;
- by applying a combination of two or more of the possibilities summed up in preceding paragraphs.

FIG. 5 shows an imitation of a silver grain 40, obtained by the combination of the regions 41 and 42. FIG. 9 shows an imitation of a silver grain 40 obtained by a combination of the regions 41, 42 and 43.

It is noted that this technique for imitating silver grains can also be applied in any laminate floor panel that imitates wood, whether or not this is a floor panel having, as described above, zones of different gloss degrees extending according to a wood pattern. As a result, the invention, according to an independent aspect, also relates to a floor panel, more particularly of the type intended for forming a floating floor covering, whereby this floor panel comprises a decor, as well as a top layer based on synthetic material, and whereby the decorative side of the floor panel imitates a wood pattern, with as a characteristic that the floor panel, at its upper side, has an imitation of one or more silver grains that is realized by the application of one or more of the following technical characteristics:

by applying a region (42) with a gloss degree altered in respect to the surrounding region thereof, preferably an increased gloss degree;

by applying a region (43) in which a general pattern of embossments (31) imitating wood pores is locally interrupted.

Further, according to this independent aspect, the imitation of such silver grain can also be enhanced by providing, in combination with the aforementioned two possibilities or in combination with one of these possibilities, also for a colour alteration at the location of this silver grain.

Figure 15:
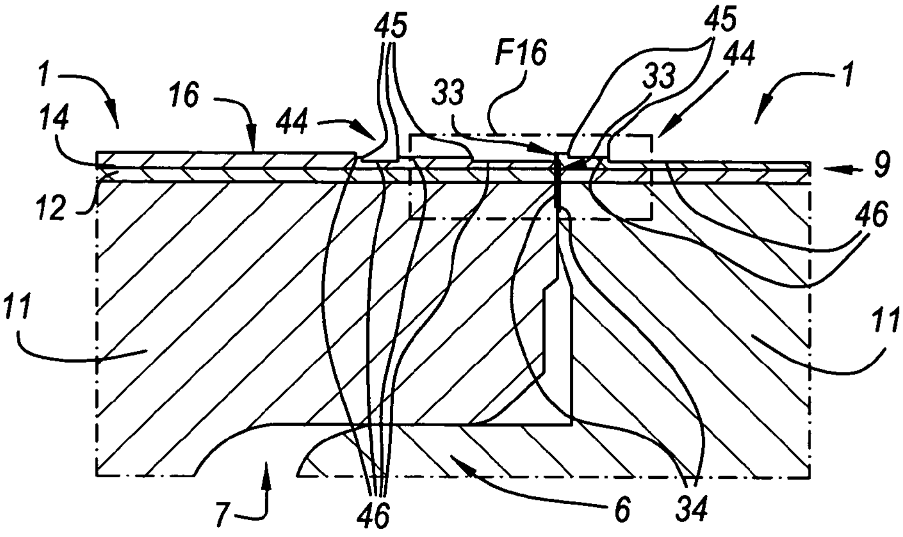
FIG. 15 represents a floor panel with the characteristics of the second aspect of the invention according to the same view as FIG. 14, however, at a larger scale.

FIG. 15 shows two floor panels 1 with the characteristics of the second aspect of the present invention. The respective floor panels 1 are represented in a coupled condition. To this aim, they are provided, at least at two opposite sides or edges 2-3, with coupling parts 6-7. The floor panels comprise a decor 8, as well as a top layer or laminate layer 9 on the basis of synthetic material and, at the sides 2-3, along which they are coupled, at the location of the aforementioned top layer or laminate layer 9, show upper edges 33, which, in a coupled condition of two floor panels 1, are intended to adjoin against each other.

The decorative side 16 of both floor panels 1 imitates slate or another flake-shaped kind of stone. To this aim, these floor panels 1 have terrace-shaped embossments 44 at their upper side or decorative side 16, whereby these embossments 44 show stepwise transitions 45 between substantially continuous embossments or terraces 46. Due to the presence of such embossments 44 on the upper edge 33 of such floor panels 1, differences in height are created between the represented coupled floor panels 1, which leads to an increased visibility of the aforementioned noticeable light-coloured seams. In order to mask these seams, according to the second aspect of the invention, the aforementioned upper edges 33, which are intended for adjoining against each other, are coloured at least at the height of the lateral edge of the laminate layer 9, as a result of which a colour layer 34 is obtained. This is clearly noticeable in FIG. 16, which represents the respective upper edges 33 of the floor panels 1 of FIG. 15 in a condition in which the floor panels 1 are shifted apart.

Figure 16:
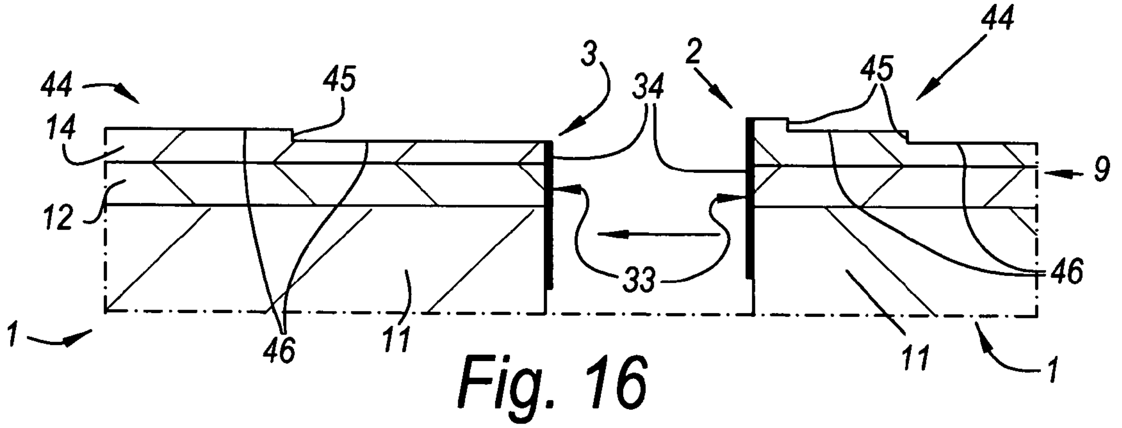
FIG. 16, at a larger scale, represents the portion indicated by F16 in FIG. 15, for a condition in which the floor panels, at their upper edges, are away from each other.

In the example of FIG. 16, the top layer or laminate layer 9, at the height of the aforementioned edges 33, is cut substantially vertical in respect to the plane of the floor panel 1.

Figure 17:
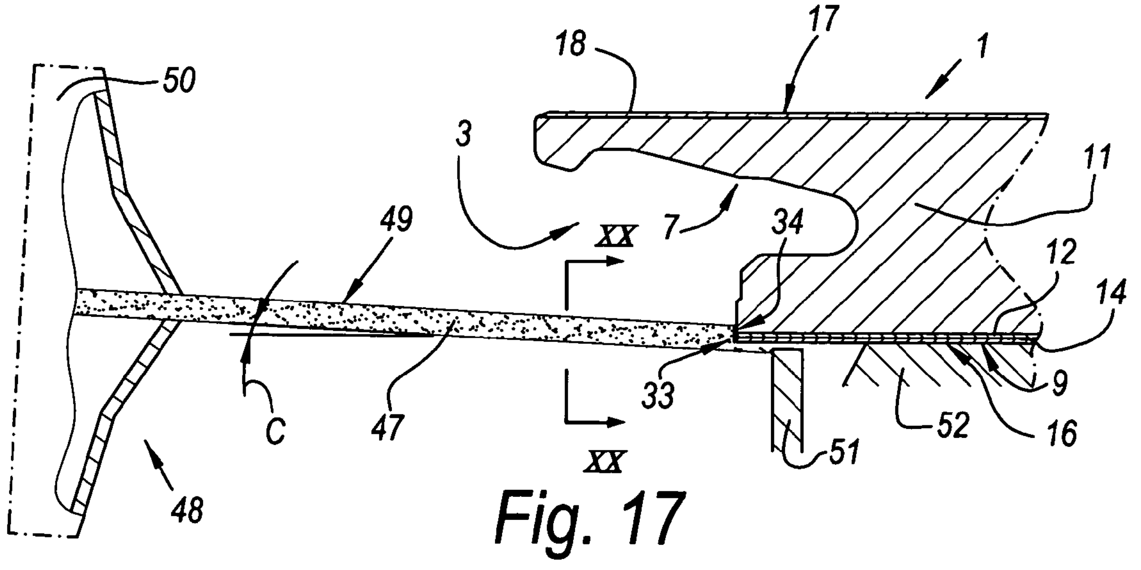
FIG. 17 represents an example of a method with the characteristics of the third aspect of the invention.

FIG. 17 represents a method for manufacturing a floor panel 1 according to the third aspect of the invention. More particularly, it relates to a method for manufacturing floor panels 1, which comprise a decor 8, as well as a top layer or laminate layer 9 of synthetic material, whereby these floor panels 1, at least at two opposite sides or edges 2-3, are provided with coupling parts 6-7, which allow that two of such floor panels 1 can cooperate with each other at these sides 2-3. As represented, the floor panels 1 hereby, at one or more upper edges 33, at least at the location of the top layer or laminate layer 9, are provided with a coloration by spraying a hardening substance 47 onto these upper edges 33, by means of an inkjet printer supply system 48.

Preferably, the not represented opposite upper edge is cut in a similar manner and is such coloration of the not represented opposite upper edge 33 performed simultaneously and in the same manner as will be described below.

It is noted that the floor panel 1, when performing the coloration, as represented, preferably is directed with its upper surface or decorative side 16 downward. This orientation of the floor panel 1 is preferably employed when manufacturing such floor panels 1, more particularly, when forming the coupling parts 6-7 thereof, as this is known, for example, from WO 97/47834. As the coloration preferably takes place in line with the forming of the coupling parts 6-7, the floor panel 1 preferably also keeps this orientation when colouring the upper edge 33 thereof.

Further, it is noted that the floor panel 1 represented in FIG. 17, after performing the method of the third aspect, shows the characteristics of the second aspect of the invention. From the arrangement of FIG. 17, it is clear that the respective method for forming the coloration 34 can be applied to any floor panel 1 having a laminate layer 9, irrespective whether or not this laminate layer 9 is provided with embossments and/or matte-glossy zones.

When performing the coloration, use is made of a jet 49, which preferably is directed such that the risk of soiling the upper surface or the decorative side 16 or the floor panel is minimum. To this aim, the head 50 of the inkjet printer 48 in the example of FIG. 17 is arranged at a limited angle C, for example, at an angle of 1° to 5° in respect to the upper side or decorative side 16 of the floor panel 1. Hereby, the direction of the jet 49 is such that the decorative side 16 is situated out of the range of the jet 49, such that the risk of the substance 47 getting on the decorative side 16 is minimized. A protective screen 51 prevents that the guide 52, on which the floor panel is lying, is soiled.

Figure 18:
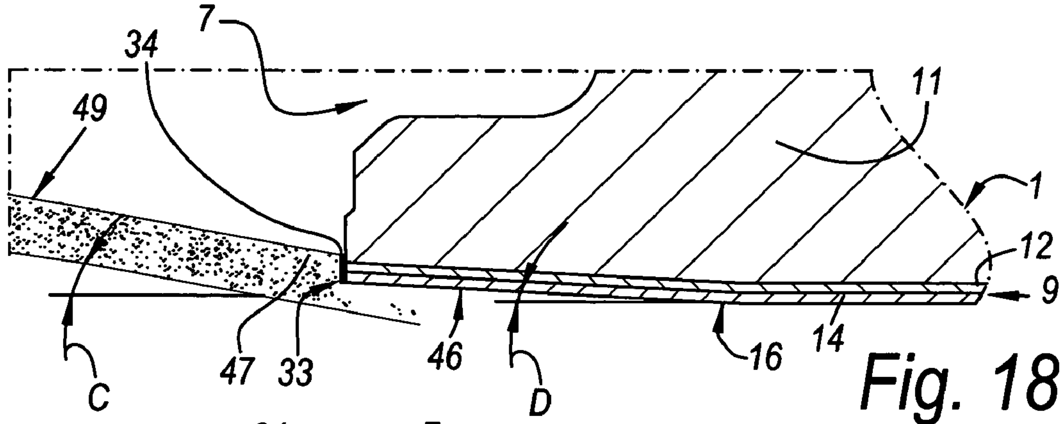
FIGS. 18 and 19 represent variants of the third aspect.

FIG. 18 represents a variant of a method according to the third aspect of the invention, whereby a coloration is performed at the upper edge 33 of a floor panel 1 having at its edge an embossment 46 of the decorative side 16. Hereby, the upper side or decorative side 16 is downwardly inclined towards the edge of the floor panel 1, at a limited angle D. The aforementioned angle C formed by the jet 49 with the upper side 16 of the floor panel 1 preferably is chosen larger than the angle D, such that the risk of soiling the decorative side 16 is minimized or even excluded.

Figure 19:
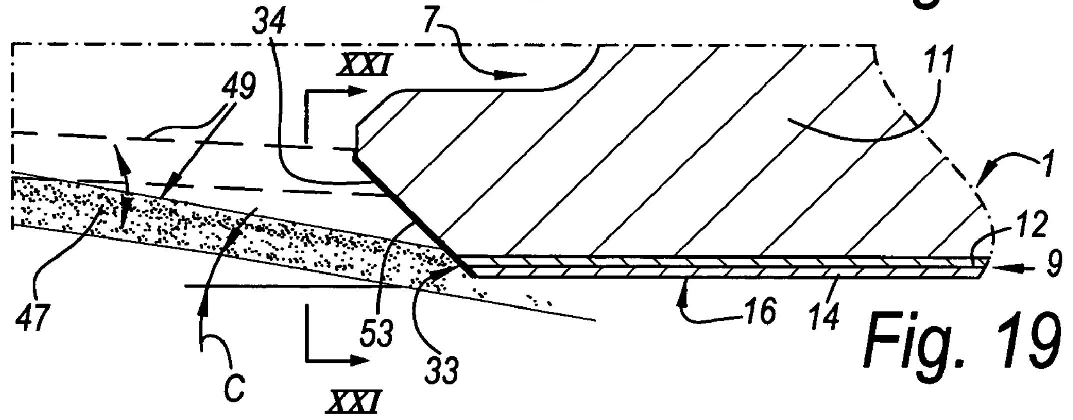

In the variant of FIG. 19, the method according to the third aspect is applied to floor panels 1, which, at their upper edges 33, are provided with a chamfer 53 or the like, whereby the surface of this chamfer 53 substantially is coloured by means of the aforementioned substance 47, such by means of the aforementioned inkjet printer supply system 48.

Figure 20:
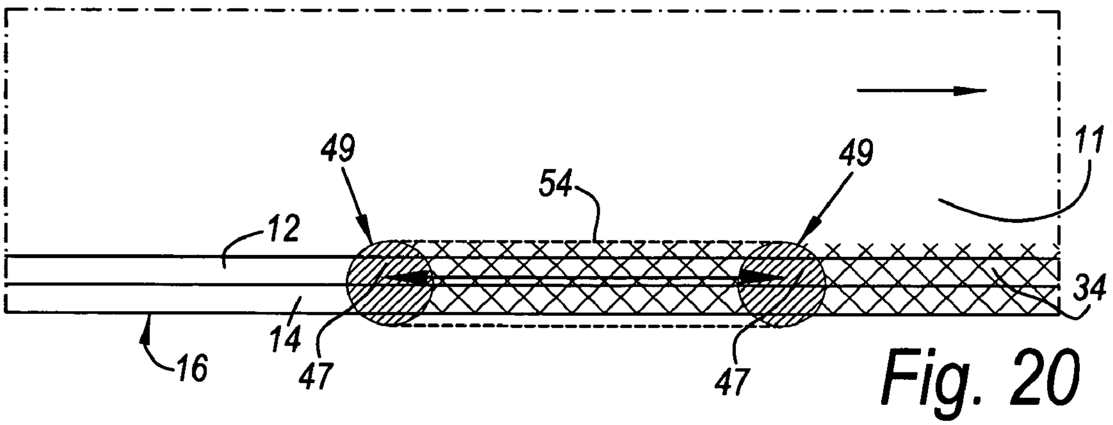
FIGS. 20 and 21 represent cross-sections according to the lines XX-XX and XXI-XXI in FIGS. 17 and 19, respectively.

In FIG. 20 is shown that the jet 49, for example, ink jet, created by the inkjet printer supply system 48, is moved by means of a control, such that the jet 49 covers a well-defined operating area 54, such while the floor panels 1 are moved with the upper edge 33 to be coloured along this operating area 54. In the example, the jet 49 performs a to-and-fro movement parallel to the longitudinal movement of the floor panel 1. The combination of the longitudinal movement of the floor panels and the to-and-fro movement of the jet 49 results in a good coverage of the lateral edge of the top layer or laminate layer 9, even if the ink is supplied in droplets by means of the jet 49.

Figure 21:
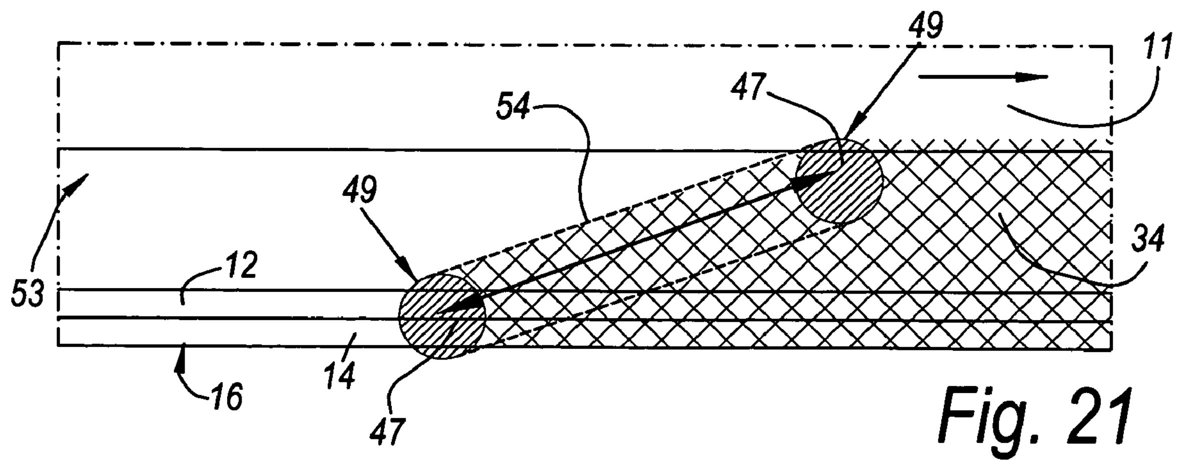

In case that a larger surface must be coloured, for example, that of the chamfer 53 from FIG. 19, the operating area 54 can be chosen differently, for example, by inclining it, as in FIG. 21, in such a manner that also in such case an optimum coverage is offered. The inclination can, for example, simply be realized by arranging the aforementioned head 50 in a somewhat turned position.

It is noted that controlling the direction of the jet 49 for performing said to-and-fro-movement can be realized in a simple manner by means of an inkjet printer supply system 48.

Finally, it is noted that the layer of synthetic material according to all aspects of the invention does not necessarily have to be obtained by pressing carrier sheets impregnated in resin or the like. In fact, the layer of synthetic material can also consist of a substance that has been applied on the surface and hardened, such as a varnish, transparent lacquer or the like, which has been applied in any manner.

In the case that the floor panels are realized by means of pressed laminate boards, the latter may be manufactured, amongst others, by means of a continuous press as well as an opening and closing press.

The present invention is in no way limited to the forms of embodiment described by way of example and represented in the figures; on the contrary, such floor panel may be realized in various forms and dimensions, without leaving the scope of the invention. For example, it is possible to combine all aforementioned aspects of the invention at choice.

The invention claimed is:

1. A laminate floor panel comprising:

a decorative side defined by a top layer including a thermoset resin, and a printed decor having at least first and second different colours forming a wood pattern, the top layer extending over the decor thereby defining an upper surface of the floor panel;

a substrate supporting the decor and the top layer;

wherein the floor panel has at least first and second zones of different gloss degrees extending over the upper surface as a function of the imitated wood pattern such that the first gloss zone is positioned in substantial correspondence over the first colour, and the second gloss zone is positioned in substantial correspondence over the second colour, the first gloss zone having a higher degree of gloss than the second gloss zone, the second gloss zone formed in part by a non-smooth structure on the top layer corresponding in location to the second gloss zone;

wherein the upper surface of the floor panel defines a plurality of embossments imitating a plurality of wood pores associated with the wood pattern, the second gloss zone extending in an area along the upper surface greater than an area of the plurality of embossments;

wherein each of the plurality of embossments extends more deeply into the top layer than the non-smooth structure of the second gloss zone;

wherein the decor extends substantially in a horizontal plane underneath the first and second gloss zones.

2. Floor panel according to claim 1, wherein for the first and second gloss zones, at least two respective gloss grades are applied, which can be distinguished by the naked eye.

3. Floor panel according to claim 1, wherein the upper side, at the location of the wood pattern, substantially shows zones of only two gloss degrees.

4. Floor panel according to claim 1, wherein the decor is realized in only two colours.

5. Floor panel according to claim 1, wherein the two colours differ at least from each other in that one colour is darker than the other.

6. Floor panel according to claim 5, wherein the darkest colour is black or a colour approaching black.

7. Floor panel according to claim 5, wherein the lighter colour is brown, brownish or grayish.

8. Floor panel according to claim 1, wherein the zones of a well-defined gloss degree, and-the matte zones, are realized larger than the corresponding colour zone, such that there is or may be an overlap at the edges.

9. Floor panel according to claim 1, wherein the two colours at least differ from each other in that the one colour is lighter than the other and that the zones with the gloss degree giving the most matte effect correspond to the zones exhibiting the lighter colour.

10. Floor panel according to claim 9, wherein the zones having the lowest gloss degree are larger than the zones in the aforementioned lighter colour, such that there is or may be an overlap at the edges, wherein the matte zones extend up into the edge region of the dark zones.

11. Floor panel according to claim 1, wherein said zones of different gloss degree are situated substantially in the same plane at the same level.

12. Floor panel according to claim 1, wherein among the zones of different gloss degree, there is a level difference that is smaller than 10 micrometers.

13. Floor panel according to claim 1, wherein in the upper surface of the floor panel, embossments are realized imitating wood pores in correspondence with the wood pattern.

14. Floor panel according to claim 1, wherein the floor panel imitates the wood species Wenge.

15. Floor panel according to claim 1, wherein at the upper edge, a coloration is provided, with a colour having a tint of which corresponds to the general tint of the decor, either in that, at least at the height of the lateral edge of the laminate layer, a colorant has been applied, or in that a material portion at the height of the upper edge is removed, whereby the formed upper surface is provided with a colour layer.

16. Floor panel according to claim 1, wherein on top of the printed decor, a coloured overlay is present having a dark decor coloured in a dark colour.

17. Floor panel according to claim 1, wherein the panel has a dark decor and that the floor panel has a substrate that is coloured with a dark colour as well.

18. Floor panel according to claim 1, wherein the zones of different gloss degree include a glossy zone and a matte zone, each gloss zone having a surface roughness generally smaller than 1 μm Ra, with the exception of possible unevennesses due to the imitation of wood pores.

19. Floor panel according to claim 1, wherein the floor panel imitates a wood pattern with a so-called flower structure and that the zones of different gloss degree correspond thereto.

20. Floor panel according to claim 1, wherein the floor panel, at its upper surface, has an imitation of one or more wood silver grains, which are realized by the inclusion of one or more of the following technical characteristics:

(a) a region in which a colour alteration has been performed;

(b) a region with a gloss degree altered in respect to the surrounding region thereof, preferably an increased gloss degree;

(c) a region in which a general pattern of embossments imitating wood pores is locally interrupted;

(d) a combination of two or more of the characteristics listed in the above paragraphs.

21. Floor panel, comprising:

a substrate;

a decor located on the substrate, and a top layer or laminate layer on the basis of synthetic material extending over the substrate, wherein the floor panel, at least at two opposite sides or edges is provided with coupling parts formed from the substrate and allowing two of such floor panels to cooperate with each other at these sides, and said coupling parts being of the type that, in a coupled condition of two of such floor panels at the respective sides, effect a locking in vertical and horizontal directions, wherein the floor panel, at the aforementioned sides, at the location of the aforementioned top layer or laminate layer, shows upper edges adjoining against each other when two of such floor panels cooperate with each other, wherein, in said coupled condition, a seam is located in the surface of the floating floor covering where the two floor panels adjoin against each other, wherein the aforementioned upper edges, at least at the height of a lateral edge of the laminate layer, are coloured by means of a colouring agent and form a coloured area, the seam at the upper surface of the floor covering having the color of the coloring agent;

wherein the coloured area extends at least from the upper edge, over the lateral edge and into an immediately adjacent area of the substrate.

22. Floor panel according to claim 21, wherein the decorative side of the floor panel imitates a wood pattern and the floor panel, at its upper surface, has zones of different gloss degrees extending over the upper surface as a function of the imitated global wood pattern.

23. Floor panel according to claim 21, wherein the decorative side of the floor panel imitates slate or another type of stone and that the floor panel has terrace-shaped embossments on the upper side.

24. Floor panel according to claim 21, wherein the floor panel differs from a floor panel with the characteristics of claim 22.

25. Floor panel according to claim 21, wherein the panel is provided with a dark decor layer.

26. Floor panel according to claim 21, wherein the floor panel is provided with a dark decor layer and imitates the wood species Wenge.

27. Floor panel according to claim 21, including a light-coloured decor layer.

28. Floor panel according to claim 21, wherein the floor panel is provided with a decor layer imitating the wood species Merbau.

29. Floor panel according to claim 21, wherein the tint of the coloration corresponds to the general tint of the decor.

30. Floor panel according to claim 21, wherein the tint of the coloration is darker than the general tint of the decor.

31. Floor panel according to claim 21, wherein the lateral edge of the laminate layer is coloured with a colorant that is provided in liquid form and subsequently is hardened.

32. Floor panel according to claim 31, wherein the colorant is ink.

33. Floor panel according to claim 31, wherein the coloration is the result of spraying or jetting the colorant onto the upper edge.

34. Floor panel according to claim 32, wherein the coloration comprises a print that has been made by means of an inkjet printer supply system.

35. Floor panel according to claim 21, wherein the top layer or laminate layer, at the location of the aforementioned upper edges, is cut substantially vertical in respect to the plane of the floor panel.

36. Floor panel according to claim 21, wherein the top layer or laminate layer is of the DPL or HPL type, wherein undesired visual effects at the location of the seams whereat two floor panels adjoin each other are masked by said colouring agent.

37. Floor panel according to claim 1, wherein the first gloss zone substantially corresponds to the entirety of the depiction of the first colour in the printed pattern.

38. Floor panel according to claim 1, wherein the top layer includes an overlay defined at least in part by the thermoset resin such that the first and second gloss zones extend only a depth into a thickness of the overlay short of the entirety thereof.

39. Floor panel according to claim 22, wherein the decor extends substantially in a horizontal plane underneath the zones of different gloss degrees.

40. Floor panel according to claim 22, wherein the top layer includes an overlay defined at least in part by the synthetic material such that first and second gloss zones extend only a depth into a thickness of the overlay short of the entirety thereof.

41. Floor panel according to claim 17, wherein the bottom side of the floor panel is dark-tinted.

* * * * *